United States Patent [19]

Block et al.

[11] Patent Number: 4,917,453

[45] Date of Patent: Apr. 17, 1990

[54] OPTICAL COMMUNICATION SIGNAL SOURCE

[75] Inventors: Timothy R. Block, Rochester; Gerald M. Heiling, Pine Island; Dennis L. Karst, Rochester; David C. Kobliska, Rochester; Tong Lu, Rochester; Ronald L. Soderstrom, Rochester, all of Minn.

[73] Assignee: International Business Machines Corporation, Armonk, N.Y.

[21] Appl. No.: 251,975

[22] Filed: Sep. 29, 1988

Related U.S. Application Data

[63] Continuation of Ser. No. 8,699, Jan. 29, 1987, abandoned.

[51] Int. Cl.[4] .............................................. G02B 6/32
[52] U.S. Cl. .................................. 350/96.20; 350/3.7; 350/96.18; 350/382; 455/610; 362/32
[58] Field of Search ................ 350/96.15, 96.16, 96.17, 350/96.18, 96.19, 96.20, 96.29, 3.72, 3.7, 379, 380, 382, 384; 250/227; 455/610, 612; 370/1, 3

[56] References Cited

U.S. PATENT DOCUMENTS

| | | | |
|---|---|---|---|
| 4,412,720 | 11/1983 | Costa | 350/96.18 |
| 4,465,332 | 8/1984 | Horner et al. | 350/96.19 |
| 4,489,477 | 12/1984 | Chik et al. | 437/129 |
| 4,497,534 | 2/1985 | Sincerbox | 350/380 X |
| 4,547,039 | 10/1985 | Cavon et al. | 350/96.21 X |

FOREIGN PATENT DOCUMENTS

| | | | |
|---|---|---|---|
| 3429282 | 4/1985 | Fed. Rep. of Germany | |
| 56-83701 | 7/1981 | Japan | |
| 58-153910 | 9/1983 | Japan | |
| 59-29219 | 2/1984 | Japan | |
| 2098353A | 11/1982 | United Kingdom | 350/96.19 |

OTHER PUBLICATIONS

Tsutsumi et al, "LD Redundancy System Using Polarization Components . . . ", IEEE J. Selected Areas in Commun., vol. SAC-2, No. 6, Nov. 1984, pp. 1020–1026.
Sincerbox I, "Formation of Optical Elements by Holography", *IBM Technical Disclosure Bulletin*, v. 10, No. 3, Aug. 1967, pp. 267–268.
Iwamura et al., "Simple Polarization—Independent Optical Circulator for Optical Transmission Systems", *Electronics Letters*, v. 15, No. 25, Dec. 1979, pp. 830–831.
Streifer et al., "Redundancy in Diode Laser Applications", *Xerox Disclosure Journal*, vol. 5, No. 4, Jul.–Aug. 1980, pp. 399–400.
Soares, "Holographic Coupler for Fiber Optics", *Optical Engineering*, vol. 20, No. 5, Sep.–Oct. 1981, pp. 740–745.
Kishimoto, "Optical Coupler for Laser Redundancy System", *Electronics Letters*, vol. 18, No. 3, Feb. 1982, pp. 140–141.

*Primary Examiner*—John D. Lee
*Attorney, Agent, or Firm*—Mason, Kolehmainen, Rathburn & Wyss

[57] ABSTRACT

An optical communication signal source package and assembly for coupling optical signals to the end of an optical fiber includes first and second semiconductor laser diodes capable of being operated in a redundant fashion for increased reliability or to provide wavelength division multiplexing for increases in bandwidth and information carrying capability. The laser diodes are supported with their mounting flanges in a common plane and are oriented to provide parallel beams of polarized light having perpendicular E-field vectors. A connector carried by the support positions the optical fiber at the target area where an optics system focuses the light beams. An optical coupling device such as a polarizing beam splitter or a holographic beam separator is responsive to the orthogonal light beams to direct both light beams toward the optical fiber with minimum decrease in amplitude. The package includes no moving parts or highly frequency selective components. The package is employed in a compact communication signal coupling assembly permitting short electrical lead lengths and high circuit density.

3 Claims, 2 Drawing Sheets

OPTICAL COMMUNICATION SIGNAL SOURCE

This application is a continuation of application Ser. No. 008,699, filed Jan. 29, 1987, now abandoned.

BACKGROUND OF THE INVENTION

This invention relates to apparatus for providing optical signals and more particularly to a highly efficient, low loss package and assembly for coupling optical signals from a pair of semiconductor laser diodes to an optical fiber.

Fiber optic communication systems such as those using graded index fiber have the potential for providing large system bandwidth and high information carrying capacity. Increased capacity would be very desirable for many types of communication systems. A significant example is data communications where a need exists for rapidly and reliably transmitting large volumes of digital information.

The system bandwidth and thus the information carrying capability of present fiber optic systems is limited by the optical sources presently is use. Signal sources using light emitting diodes optically coupled to optical fibers have the advantage of relatively low cost, but exhibit poor coupling efficiency in the range of about three to five percent with bandwidth limited to about two hundred megabits per second. Due to this undesirably low coupling efficiency, telecommunication grade laser sources have also been used. However, such laser sources having relatively long wavelengths in the 1300 or 1500 nanometer region, although otherwise generally satisfactory, are very costly and prohibitively expensive for many possible aplications.

As a result of these difficulties with light emitting diodes and long wavelength laser sources, it would be desirable to provide an optical source using readily available and relatively inexpensive short wavelength laser diodes. Such devices can be directly modulated at rates in excess of 500 megabits per second, thus offering the advantage of additional bandwidth and information carrying capability in a fiber optic communication system. A single laser diode can be optically coupled to an optical fiber with a coupling efficiency exceeding fifty percent. Despite such significant potential advantages, the problem of providing an acceptable semiconductor laser diode optical signal source has not been solved. One roadblock has been the inconsistent failure rate and questioned reliability of semiconductor laser diode devices. Another difficulty has been the failure prior to the present invention to provide a practical signal source package taking full advantage of the high potential coupling efficiency of a semiconductor laser diode in a rugged, reliable and inexpensive package.

United Kingdom patent application GB 2 098 353 A discloses an optical coupler for a redundant pair of semiconductor lasers, one serving as an operating light source and the other as a standby light source. The coupler includes a pair of polarization maintaining single mode fibers serving as confined light paths extending to adjacent faces of a polarizing beam splitter having its output connected to a main optical fiber. Although the use of redundant laser diode sources responds to the concern about long term unreliability of such devices, the disclosed optical coupler arrangement does not provide a practical signal source package and is subject to undesirably large coupling losses at both the semiconductor laser end and the polarized beam splitter end of each expensive and difficult to manufacture polarization maintaining single mode fiber.

U.S. Pat. No. 3,512,868 discloses apparatus for forming a beam of light in which light from a pair or some other number of light sources is polarized, reflected, transmitted and combined in order to provide a controlled beam of unpolarized light. Due to the use of techniques such as reflection and recombination of various light components, the arrangements disclosed in this patent are unsuitable for fiber optic communication systems. Moreover, the use of components such as quarter wave light retarders renders the apparatus undesirably frequency sensitive.

U.S. Pat. No. 4,588,262 discloses a multi-laser switch using redundant lasers coupled to an unspecified output by means of polarized beam splitters. Although this patent expressly recognizes the importance of eliminating all moving parts, nevertheless the switches there disclosed employ movable half wave plates rendering the switch expensive, sensitive and unsuitable for high reliability fiber optic communications systems. In addition, the use of half wave plates renders the switch undesirably frequency dependent.

SUMMARY OF THE INVENTION

It is an important object of the present invention to provide an optical communication signal source package employing semiconductor laser diodes and providing the advantages of low cost, reliability and increased bandwidth. Other principal objects of this invention are to provide a sturdy and low cost package having no moving parts and exhibiting a high degree of reliability over long periods of unattended use; to provide an optical signal source package achieving optimum coupling efficiency and minimum losses in order to make possible increased optical fiber system bandwidth and information carrying capability; to provide a package minimizing electrical lead length requirements and thus well suited for operation at high modulation frequencies; to provide a package useful in different modes including a redundant laser source mode and a wave length division multiplexing mode; and to provide an assembly including a circuit board taking full advantage of important freatures of the optical communication signal source package of the present invention.

In brief, the above and other objects and advantages of the present invention are attained with an optical communication signal source package for coupling optical signals to the end of an optical fiber. The package includes a support with first and second semiconductor laser diodes mounted on the support with their mounting flanges in a common plane. The laser diodes are oriented to provide parallel beams of polarized light having different orthogonal planes of polarization. The support also carries a connector spaced from the laser diodes having an aperture and having means for holding an optical fiber with its end positioned at the aperture. First and second predefined light paths extend respectively from the first and second laser diodes to the connector. Lenses are located in the light paths. A polarization responsive optical coupling device is disposed in both light paths and is responsive to the different polarization planes to direct substantially the entire amplitudes of both light beams toward the end of the optical fiber at the connector aperture.

The present invention further provides an assembly of an optical communications signal source package with a circuit board or card. The package includes a housing with the laser diode flanges in a common plane adjacent an exterior wall of the housing. The circuit board includes an aperture in which the housing is mounted with the plane of the board intersecting the housing adjacent electrical leads extending from the mounting flanges. The leads are connected to conductive regions on the board and are desirably short in length.

DESCRIPTION OF THE VIEWS OF THE DRAWING

The present invention together with the above and other objects and advantages may best appear from the following detailed description of preferred embodiments of the invention in which reference is made to the accompanying drawings wherein.

DETAILED DESCRIPTION

Figure 1:
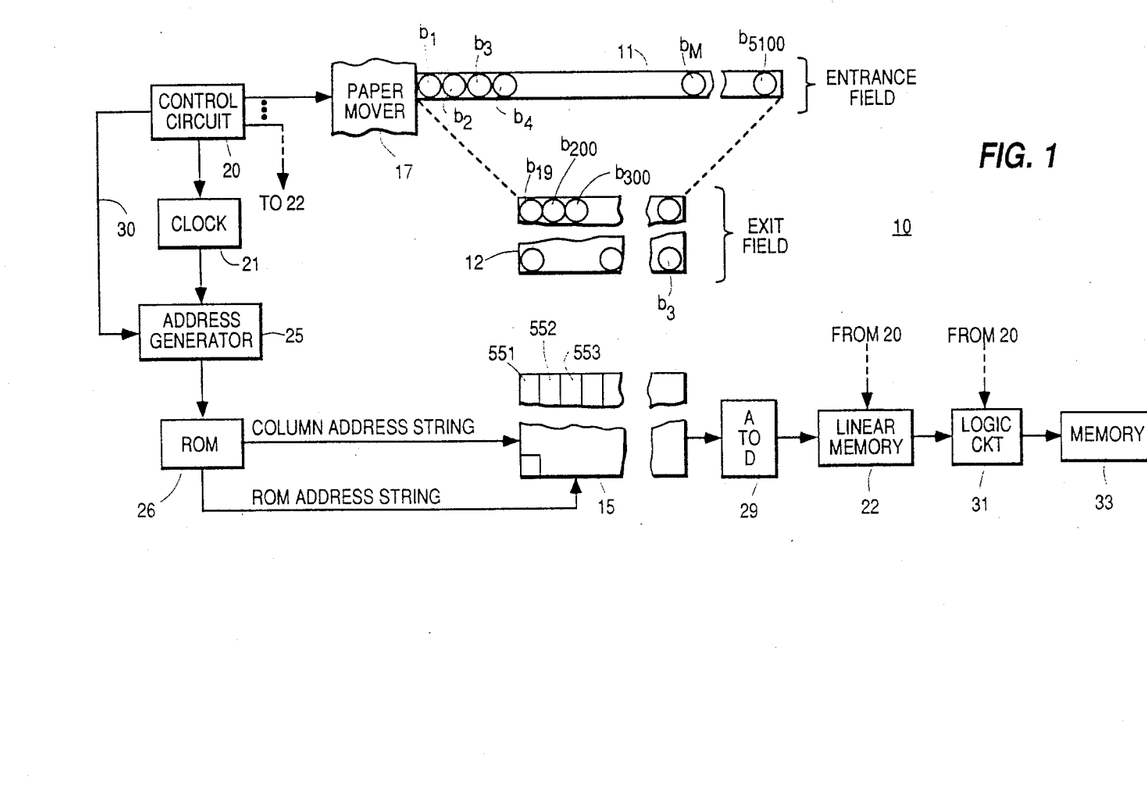
FIG. 1 is a schematic and block diagram view of an optical communications signal source package and assembly of the present invention.

Having reference first to FIG. 1, there is illustrated in schematic and block diagram form an assembly designated in its entirety by the reference character 20 for generating modulated optical communication signals and coupling such signals to the end of an optical fiber 22. The assembly 20 includes a self-contained optical signal source package or module generally designated as 24. The assembly 20 and the package 24 are constructed in accordance with the principles of the present invention.

While the present invention may provide advantages in optical communication systems of many types, the illustrated preferred embodiments are particularly useful in providing directly modulated light signals for fiber optic systems using multimode optical fiber, such as intrabuilding communication systems and other similar systems having line lengths generally less than ten kilometers. Systems of this type have high potential bandwidth and information carrying capabilities successfully utilized by the assembly 20 and the package 24 of the present invention. Increased information carrying capability is highly desirable for high information density data communications. For example, the package 24 of this invention is well suited for the transmission of high frequency digital signals.

Package 24 includes a unitary support 26. We intend the term "unitary" to mean that support 26 is either of one piece or, if of more than one piece, the pieces remain fixed with respect to one another after assembly during normal operation. A pair of semiconductor laser diodes 28 and 30 and a connector 32 for optical fiber 22 are mounted in fixed and spaced apart positions by support 26. An optics system generally designated as 34 also carried in a fixed position by support 26 focuses light beams 28A and 30A from the semiconductor laser diodes 28 and 30 upon the terminated end of optical fiber 22 mounted in a mating connector 36 detachable from connector 32. The optics system 34 provides unconfined light paths for the beams 28A and 30A. In this description, the term "unconfined" means that the light paths do not travel through optical fibers or other substantial coupling loss inducing elements.

In accordance with one important feature of the present invention, the laser diodes 28 and 30 include mounting flanges 38 and 40 supported in a common plane by the support 26. This arrangement has important advantages in the mounting and use of package 24 as part of assembly 20. Since flanges 38 and 40 are coplanar, light beams 28A and 30A projected from casings 42 and 44 of laser diodes 28 and 30 are parallel with one another. In accordance with another important feature of the present invention, the optics system 34 couples both beams to the end of optical fiber 22 with equal minimum loss and maximum efficiency.

In the embodiment of the invention illustrated in FIG. 1, the optics system 34 includes a polarizing beam splitter 46 constituted of a pair of optical prisms 48 and 50 attached together at a common polarization responsive reflecting face 52 by bonding, optical contact or the like. Beam splitter 46 lies along the straight line path of the light beam 28A.

A reflector 54 directs the light beam 30A along a longer, cornered path toward the beam splitter 46. In the illustrated arrangement, reflector 54 is a total internally reflecting prism with a full reflecting surface 56. prism 54 is attached to the beam splitter 46 by bonding. optical contact or the like. A second polarizing beam splitter may be used as a reflector in place of the total internally reflecting prism 54 illustrated in the drawings.

A pair of lenses 58 and 60 are supported respectively in the paths of light beams 28A and 30A near but spaced from the semiconductor laser diodes 28 and 30. Lenses 58 and 60 have different effective focusing lengths corresponding to the different lengths of the paths of travel of the light beams 28A and 30A. The path of light beam 30A is longer by a distance equal to the distance between the reflecting surface 56 and the reflecting face 52. Lens 58 receives the diverging light beam emitted by laser diode 28 and focuses the light beam upon the end of optical fiber 22. The lens 60 receives the diverging light beam emitted by laser diode 30 and has a longer effective focusing length to focus the light beam 30A at the same area upon the end of optical fiber 22.

The semiconductor laser diodes 28 and 30 need not be expensive, high quality communication grade lasers, but may even be, for example, any of the types readily available in industry standard packages at relatively low cost and commonly used in compact disc players. For example, suitable types include Mitsubishi Model ML4412A, Sharp Model LT-023MD and Sony Model SLD101V. Since the optics system 34 does not include components that are highly selective to frequency, the expense of package 24 is reduced because specification or selection of precise or narrow frequency ranges is not required.

A characteristic of semiconductor laser diodes such as laser diodes 28 and 30 is that they inherently emit a polarized light beam. The present invention takes advantage of this fact to direct the light emitted from diodes 28 and 30 toward the optical fiber 22 with no significant loss of amplitude. As a result, both optical signals can be coupled to the optical fiber 22 with the same efficiency, for example about fifty percent, that can be achieved by coupling a single laser diode through only a focusing lens directly to an optical fiber.

More specifically, the semiconductor laser diode 28 is oriented so that its output beam is P polarized. Thus beam 28A is transmitted through the polarizing beam splitter 46 with no significant loss of amplitude. Laser diode 30 is oriented in a ninety degree rotationally offset position so that its output beam is S polarized. As a result, when beam 30A is reflected from surface 56 toward the reflecting face 52 of the polarizing beam splitter 46, the beam 30A is reflected with no significant loss of amplitude toward the end of the optical fiber 22.

Also illustrated in block diagram form in FIG. 1 is a control circuit generally designated as 62 for controlling the operation of the semiconductor laser diodes 28 and 30. Control circuit 62 includes a driver circuit 64 having an input line 66 coupled to a signal source 68. For example, the signal source 68 or the driver circuit 64 may include conventional parallel to serial communications interface circuitry for converting digital, multi bit data bus signals from a computer into high frequency serial data signals for transmission to another nearby computer, or even to physical cabinet of the same computer. Laser diodes 28 and 30 are connected by electrical leads 70 to driver circuit 64 for direct light intensity modulation in accordance with the digital data signals.

Semiconductor laser diodes such as those identified above by model number include an internally mounted photodetector commonly known as a monitor diode. Additional electrical leads 70 extend from the monitor diodes of laser diodes 28 and 30 to an amplitude detection circuit 72. This circuit is coupled by line 74 to the driver circuit 64 for feedback control of laser diode modulation intensity level. Circuit 72 may also be coupled to a suitable diagnostic circuit 76 for providing an indication or control signal in response to decreasing efficiency of operation of laser diode 28 and/or laser diode 30.

Different modes of operation of the assembly 20 are contemplated by the present invention. One mode of operation overcomes difficulties that may be encountered due to high or unpredictable failure rates of semiconductor laser diodes. Experience with such laser diodes has suggested that some percentage of such devices may have an undesirably short life. This problem can be overcome by utilizing the laser diodes 28 and 30 as redundant components. In this type of arrangement, one of the laser diodes, for example the laser diode 28, is initially operated while the other laser diode, for example laser diode 30, is maintained as a standby light source in an unenergized condition. Driver circuit 64 energizes and modulates only the operating laser diode 28. In the event that the amplitude detection circuit 72 provides a signal indicating that the operating laser diode has degraded in performance to a level indicative of imminent failure, then the driver circuit 64 is controlled to discontinue energization of the operating laser diode and to initiate energization of the standby laser diode. Since both beams 28 and 30 are coupled to the optical fiber 22 with substantially equal high efficiency, the assembly 20 operates in a similar manner regardless of which laser diode 28 or 30 is operated.

In a different mode of operation, the assembly 20 can be used to provide wavelength division multiplexing. In this mode of operation, the laser diodes 28 and 30 are operated simultaneously at different wavelengths, for example at 780 nanometers and 830 nanometers respectively. Wavelength division multiplexing extends the bandwidth of fiber optic communication systems while maintaining compatibility with presently installed system components such as multimode optical fibers, detectors and transmitter and receiver electronics.

Since the package 24 of the present invention includes no strongly frequency discriminating components, it is well adapted for wavelength division multiplexing. In addition, since the light beams 28A and 30A are not significantly attenuated by the optics system 34, the package 24 provides a great increase in efficiency over the amplitude beam splitter techniques currently widely used for wavelength division multiplexing. Since the present invention does not suffer from the approximate fifty percent loss incurred with partly reflective amplitude beam splitters, an approximate doubling of coupling efficiency is made possible.

Figure 2:
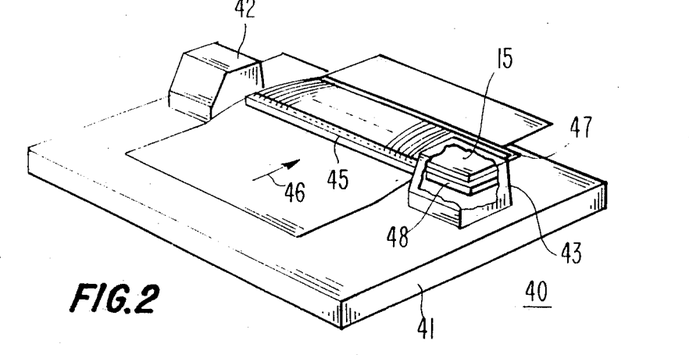
FIG. 2 is a schematic view of an alternative optical communication signal source package of the present invention.

FIG. 2 illustrates an optical communication signal source package generally designated as 80. The package 80 is an alternative embodiment of the present invention and may be used in place of the package 24 in the assembly 20 of FIG. 1. The components of packages 24 and 80 and their operation are similar in some respects, and the same reference characters are employed for similar components.

Package 80 includes an optics system generally designated as 82 for transmitting and focusing light beams 28A and 30A upon the end of optical fiber 22. The optics system 82 differs from the optics system 34 of package 24 in that it utilizes holographic optic elements.

More specifically, optics system 82 includes a holographic beam separator 84 responsive to the orthogonally different planes of polarization of beams 28A and 30A for directing both beams along paths toward optical fiber 22 with no significant loss of amplitude. U.S. Pat. No. 4,497,534 discloses the construction and operation of the holographic beam separator 84, and the disclosure of that patent is incorporated herein by reference. The separator 84 in the optic system 82 is oriented to act as a transmission hologram for both of the light beams 28A and 30A. In order to direct both light beams toward the fiber 22, the element 84 is employed as a beam combiner rather than as a beam separator when both beams are present.

The diverging light beams 28A and 30A emitted by laser diodes 28 and 30 are S and P polarized respectively and are collimated and directed toward the holographic beam separator 84 by a pair of holographic optical elements 86 and 88. The collimated light beam transmitted by the holographic beam separator 84 is focused by a third holographic optical element 90 upon the end of the optical fiber 22 positioned by connector 32. Elements 86 and 88 may be referred to as collimating lens holographic optical elements since they provide a function related to that of a collimating optical lens. Similarly, element 90 may be referred to as a focusing lens holographic optical element since it provides a function related to that of a focusing optical lens. A further description of the construction and operation of the holographic optical elements 86, 88 and 90 may be found in "FORMATION OF OPTICAL ELEMENTS BY HOLOGRAPHY", G. T. Sincerbox, IBM Technical Disclosure Bulletin, Volume 10, No. 3, August, 1967, incorporated herein by reference.

Other orientations of the components of the optics system 82 are possible. As one example, the light beams 28A and 30A may be directed by elements 86 and 88 against opposite faces of the holographic beam separator 84 rather than against the same face as shown in FIG. 2. In this case, the separator 84 may act as a transmission hologram for one of the laser diodes and a reflection hologram for the other laser diode. In addition, the holographic optical element 90 may be of the type directing beams 28A and 30A along a straight line toward the optical fiber 22 rather than providing an angular path. The angular path configuration of FIG. 2 provides advantages in circuit packaging because the fiber 22 is parallel with the axes of semiconductor laser diodes 28 and 30.

Both the embodiments of FIGS. 1 and 2 provide important advantages. Since the laser mounting flanges 38 and 40 are coplanar, improvements in packaging including short electrical lead lengths are possible. Since there are no moving parts, a simple, rugged and reliable arrangement is achieved. The light beams 28A and 30A coincide over a segment of their transmission paths in both embodiments, and this contributes to an extremely compact arrangement. In both constructions, the lasers 28 and 30 may be operated either in a redundant manner or to provide wavelength division multiplexing. In each arrangement, high coupling efficiency and low losses are made possible, providing a substantial improvement over partly reflective amplitude beam splitters used in the past.

Figure 3:
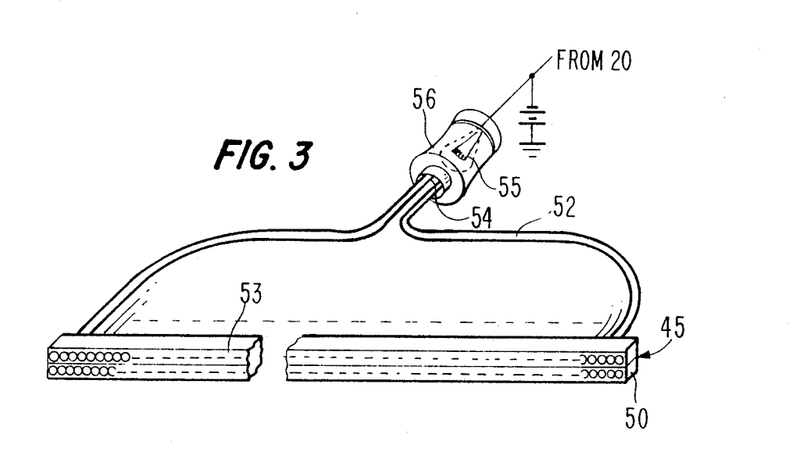
FIG. 3 is a perspective view of the package shown in schematic form in FIG. 1.
Figure 4:
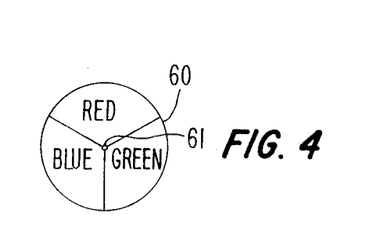
FIG. 4 is a sectional view taken along the line 4—4 of FIG. 3.

Referring now to FIGS. 3 and 4, the construction of the optical communication signal source package 24 is illustrated in more detail. Although support 26 may take various forms, in the illustrated embodiment there is provided a housing 100 including a base 102 and cover 104 fixed together to form a unitary assembly and defining opposed exterior side walls 106 and 108. The polarizing beam splitter 46 and the attached reflector 54 are secured in an internal chamber 110 defined in the side of the base 102 opposite the side wall 106. This chamber is closed when the cover 104 is attached.

Semiconductor laser diodes 28 and 30 are received in a pair of similar recesses 112 formed in side wall 106. Each recess includes a mounting shoulder 114 against which the coplanar mounting flanges 38 and 40 seat precisely to position the laser diodes 28 and 30. A pair of apertures 116 and 118 extend from the recesses 112 to the cavity 110. Lenses 58 and 60 are received in the apertures 116 and 118 and are accurately positioned against shoulders 120 and 122. The laser diodes 28 and 30 and the components of the optic system 34 are secured in fixed positions in housing 100 in any suitable way such as by adhesive bonding.

The leads 70 of the semiconductor laser diodes 28 and 30 conveniently extend from the housing side wall 106 since the mounting flanges 38 and 40 are coplanar with or closely adjacent the side wall 102. This arrangement permits the installed lead lengths to be extremely short and permits the length of the leads 70 of both laser diodes to be substantially the same.

Optical fiber 22 in the described embodiment is a 50/125 multimode fiber having a fifty micron core within a cladding having an outside diameter of 125 microns. The beams 28A and 30A are focused by the lenses 58 and 60 upon a target area having a diameter of about ten microns located at the center of the end of the optical fiber core.

Connector 32 functions in combination with connector 36 accurately to locate the end of optical fiber 22 at the target area. Connector 32 includes an externally threaded, annular connector body 124 having a central apeture 126 at which the fiber 22 is centrally aligned. The cooperating connector 36 includes a ferrule 128 releasably held against a mounting shoulder 130 of body 124 by a threaded compression cap 132 releasably engageable with the body 124.

Although other types of lenses such as optical glass lenses could be used, the package 24 illustrated in FIGS. 3 and 4 uses graded index lens elements. In order to provide a longer effective focusing length or pitch length for the light beam 30A, the lens 58 is somewhat longer than the lens 60.

As seen in FIG. 3, orientation notches 28B and 30B of the semiconductor laser diodes 28 and 30 are rotationally offset from one another by ninety degrees. In order to simplify assembly, offset alignment ribs 134 and 136 are provided in recesses 112 so that the laser diodes can be mounted only in the proper position to provide light beams having E-field vectors at right angles to one another.

Figure 5:
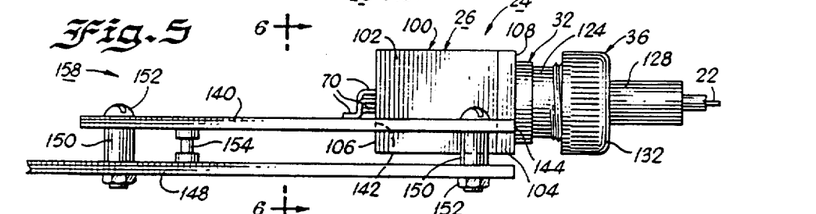
FIG. 5 is a side elevational view of an optical coupling assembly of the present invention incorporating the package of FIGS. 3 and 4.
Figures 6, 7:
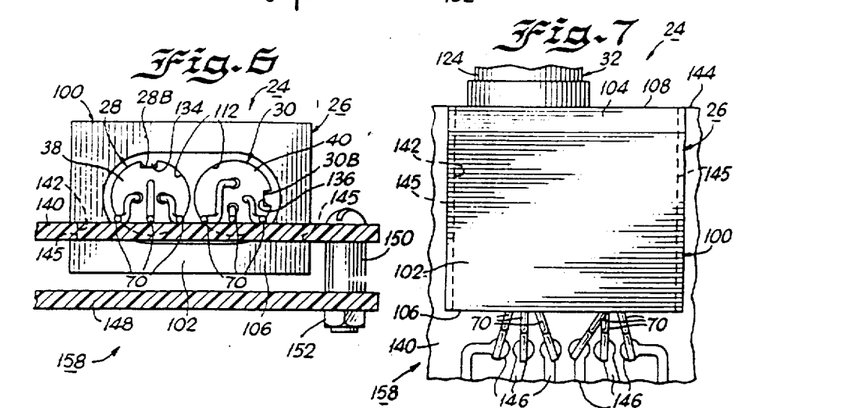
FIG. 6 is a view of part of the assembly of FIG. 5 taken along the line 6—6 of FIG. 5.
FIG. 7 is a top plan view of part of the assembly of FIG. 5.

FIGS. 5 and 6 illustrate advantages in packaging techniques that can be obtained with the signal source package 24 of the present invention. The same advantages can be obtained with the package 80 illustrated in FIG. 2.

In FIG. 5 there is illustrated an optical communication signal coupling assembly 138 in which the signal source package 24 is mounted to a circuit board or card 140. A compact and convenient arrangement is provided because the package 24 is mounted in an aperture or notch 142 at an edge 144 of board 140 by grooves 145 in housing 100 or by other suitable means. As best seen in FIG. 6, the plane of the board 140 intersects the housing 100 of the package 24 and the leads 70 of the laser diodes 28 and 30 extend from the housing side wall 106 very close to the surface of the board 140. This close proximity permits the leads 70 to be connected to conductive regions 146 of the board with only short lead lengths required. These short lead lengths are desirable with high frequency signals such as made possible by the present invention. The leads 70 are surface mounted by solder to the conductive regions 146, although through hole soldering or other types of connecting or soldering arrangements are possible.

Although not illustrated in FIGS. 5-7, it should be understood that the driver circuit 64 and other components of the control circuit 62 shown in FIG. 1 may be incorporated into electrical components also mounted on and electrically connected to the board 140.

Circuit board 140 in the arrangement of FIG. 5 is a daughter board mounted upon a mother board 148 by suitable standoffs 150 and fasteners 152, although other mounting arrangements, such as edge connectors, interboard electrical connectors and the like are possible. Electrical connections extend between the boards 140 and 148 through one or more conventional electrical connectors indicated schematically by the reference character 154.

Since the plane of the board 140 intersects the housing 100 of the package 24, an extremely compact multiboard assembly is possible. The overall height of the assembly as illustrated in FIG. 5 need be only slightly greater than the vertical height of the housing 100, and the boards 140 and 148 are spaced apart by a distance less than that vertical height. This narrow configuration permits the assembly of FIG. 5 to be accommodated in one of a number of modular circuit board slots of the type widely used in computers and other data processing equipment. For this purpose the mother board may have conductive regions engageable with standard edge card connectors. When so installed, the optical fiber connector 32 is properly positioned to serve as a signal output port at the location conventionally provided in such equipment.

We claim:

1. An optical communication signal source package for coupling optical signals to an end of an optical fiber, said package comprising in combination:

a support;

first and second short wavelength semiconductor laser diodes each having a mounting flange and means for emitting a beam of polarized light;

said laser diodes being mounted on said support with said flanges in a common plane and being oriented to provide parallel beams of polarized light having different orthogonal planes of polarization;

a first connector carried by said support at a location spaced from said laser diodes, said first connector having an aperture and a second connector, the optical fiber mounted in said second connector, said first and second connectors cooperating for positioning the end of the optical fiber at said first connector aperture, and said second connector being releasably engageable with said first connector;

first and second predefined light paths extending respectively from said first and second laser diodes to said first connector aperture;

first and second lens means located in said first and second light paths for receiving said parallel beams of polarized light from said laser diodes and for directing said light beams toward said first connector aperture; and a polarization responsive optical coupling device carried by said support between said first and second lens means and said first connector aperture and disposed in both of said light paths and responsive to said orthogonal polarization planes to direct substantially the entire amplitudes of both light beams toward said first connector aperture, said coupling device comprising a holographic beam separator.

2. An optical communications signal source package as defined in claim 1, said lens means including first and second collimating lens holographic optical elements located in said first and second light paths respectively between said first and second laser diodes and said holographic beam separator.

3. An optical communications signal source package as defined in claim 2, said lens means further including a third focusing lens holographic optical element located between said holographic beam separator and said aperture.

* * * * *

UNITED STATES PATENT AND TRADEMARK OFFICE
CERTIFICATE OF CORRECTION

PATENT NO.   : 4,917,453

DATED        : April 17, 1990

INVENTOR(S)  : Block et al

It is certified that error appears in the above-identified patent and that said Letters Patent is hereby corrected as shown below:

The sheets of drawing consisting of figures 1-4 should be deleted to appear as per attached sheets consisting of figures 1-7.

The title page showing the illustrative figure should be deleted to appear as per attached title page.

Signed and Sealed this

Sixteenth Day of April, 1991

*Attest:*

HARRY F. MANBECK, JR.

*Attesting Officer*     *Commissioner of Patents and Trademarks*

United States Patent [19]

Block et al.

[11] Patent Number: 4,917,453
[45] Date of Patent: Apr. 17, 1990

[54] OPTICAL COMMUNICATION SIGNAL SOURCE

[75] Inventors: Timothy R. Block, Rochester; Gerald M. Heiling, Pine Island; Dennis L. Karst, Rochester; David C. Kobliska, Rochester; Tong Lu, Rochester; Ronald L. Soderstrom, Rochester, all of Minn.

[73] Assignee: International Business Machines Corporation, Armonk, N.Y.

[21] Appl. No.: 251,975

[22] Filed: Sep. 29, 1988

Related U.S. Application Data

[63] Continuation of Ser. No. 8,699, Jan. 29, 1987, abandoned.

[51] Int. Cl.⁴ .............................................. G02B 6/32
[52] U.S. Cl. ................................ 350/96.20; 350/3.7; 350/96.18; 350/382; 455/610; 362/32
[58] Field of Search .............. 350/96.15, 96.16, 96.17, 350/96.18, 96.19, 96.20, 96.29, 3.72, 3.7, 379, 380, 382, 384; 250/227; 455/610, 612; 370/1, 3

[56] References Cited

U.S. PATENT DOCUMENTS

| | | | |
|---|---|---|---|
| 4,412,720 | 11/1983 | Costa | 350/96.18 |
| 4,465,332 | 8/1984 | Horner et al. | 350/96.19 |
| 4,489,477 | 12/1984 | Chik et al. | 437/129 |
| 4,497,534 | 2/1985 | Sincerbox | 350/380 X |
| 4,547,039 | 10/1985 | Cavon et al. | 350/96.21 X |

FOREIGN PATENT DOCUMENTS

| | | | |
|---|---|---|---|
| 3429282 | 4/1985 | Fed. Rep. of Germany | |
| 56-83701 | 7/1981 | Japan | |
| 58-153910 | 9/1983 | Japan | |
| 59-29219 | 2/1984 | Japan | |
| 2098353A | 11/1982 | United Kingdom | 350/96.19 |

OTHER PUBLICATIONS

Tsutsumi et al, "LD Redundancy System Using Polarization Components . . . ", IEEE J. Selected Areas in Commun., vol. SAC-2, No. 6, Nov. 1984, pp. 1020-1026.
Sincerbox I, "Formation of Optical Elements by Holography", IBM Technical Disclosure Bulletin, v. 10, No. 3, Aug. 1967, pp. 267-268.
Iwamura et al., "Simple Polarization—Independent Optical Circulator for Optical Transmission Systems", Electronics Letters, v. 15, No. 25, Dec. 1979, pp. 830-831.
Streifer et al., "Redundancy in Diode Laser Applications", Xerox Disclosure Journal, vol. 5, No. 4, Jul.-Aug. 1980, pp. 399-400.
Soares, "Holographic Coupler for Fiber Optics", Optical Engineering, vol. 20, No. 5, Sep.-Oct. 1981, pp. 740-745.
Kishimoto, "Optical Coupler for Laser Redundancy System", Electronics Letters, vol. 18, No. 3, Feb. 1982, pp. 140-141.

Primary Examiner—John D. Lee
Attorney, Agent, or Firm—Mason, Kolehmainen, Rathburn & Wyss

[57] ABSTRACT

An optical communication signal source package and assembly for coupling optical signals to the end of an optical fiber includes first and second semiconductor laser diodes capable of being operated in a redundant fashion for increased reliability or to provide wavelength division multiplexing for increases in bandwidth and information carrying capability. The laser diodes are supported with their mounting flanges in a common plane and are oriented to provide parallel beams of polarized light having perpendicular E-field vectors. A connector carried by the support positions the optical fiber at the target area where an optics system focuses the light beams. An optical coupling device such as a polarizing beam splitter or a holographic beam separator is responsive to the orthogonal light beams to direct both light beams toward the optical fiber with minimum decrease in amplitude. The package includes no moving parts or highly frequency selective components. The package is employed in a compact communication signal coupling assembly permitting short electrical lead lengths and high circuit density.

3 Claims, 2 Drawing Sheets